(12) United States Patent
Chu et al.

(10) Patent No.: US 10,401,558 B2
(45) Date of Patent: Sep. 3, 2019

(54) EDGE-LIT BACKLIGHT UNIT WITH LIGHT GUIDE PLATE HAVING EXTENDING PORTION AND DISPLAY DEVICE

(71) Applicants: BOE Technology Group Co., Ltd., Beijing (CN); Hefei BOE Optoelectronics Technology Co., Ltd., Hefei (CN)

(72) Inventors: Hanqi Chu, Beijing (CN); Site Cai, Beijing (CN); Jinmoo Park, Beijing (CN); Wei Lei, Beijing (CN)

(73) Assignees: BOE Technology Group Co., Ltd., Beijing (CN); Hefei BOE Optoelectronics Technology Co., Ltd., Hefei (CN)

( * ) Notice: Subject to any disclaimer, the term of this patent is extended or adjusted under 35 U.S.C. 154(b) by 193 days.

(21) Appl. No.: 15/325,571

(22) PCT Filed: Jul. 6, 2016

(86) PCT No.: PCT/CN2016/088810
§ 371 (c)(1),
(2) Date: Jan. 11, 2017

(87) PCT Pub. No.: WO2017/143719
PCT Pub. Date: Aug. 31, 2017

(65) Prior Publication Data
US 2018/0224593 A1    Aug. 9, 2018

(30) Foreign Application Priority Data

Feb. 22, 2016  (CN) ........................ 2016 1 0096169

(51) Int. Cl.
*G02B 6/00*  (2006.01)
*F21V 8/00*  (2006.01)

(52) U.S. Cl.
CPC ............. *G02B 6/0088* (2013.01); *G02B 6/00* (2013.01); *G02B 6/0021* (2013.01); *G02B 6/0046* (2013.01); *G02B 6/0055* (2013.01)

(58) Field of Classification Search
CPC .. G02B 6/0028; G02B 6/0046; G02B 6/0048; G02B 6/0088; G02B 6/0055; G02B 6/0021
See application file for complete search history.

(56) References Cited

U.S. PATENT DOCUMENTS

| 4,909,604 A | * | 3/1990 | Kobayashi | ................ F21V 7/00 349/64 |
| 5,988,827 A | | 11/1999 | Lee | |
| 2016/0341885 A1 | * | 11/2016 | Xie | ................... G02F 1/133608 |

FOREIGN PATENT DOCUMENTS

| CN | 1971377 A | 5/2007 |
| CN | 102691933 A | 9/2012 |

(Continued)

OTHER PUBLICATIONS

Sep. 26, 2016—(WO) International Search Report and Written Opinion Appn PCT/CN2016/088810 with English Tran.

(Continued)

*Primary Examiner* — Karabi Guharay
(74) *Attorney, Agent, or Firm* — Banner & Witcoff, Ltd.

(57) ABSTRACT

An edge-lit backlight unit and a display device are provided. The backlight unit includes a light guide plate and a rubber frame, wherein, the light guide plate includes a main body portion, the main body portion is of a flat plate structure and includes a first main surface, and a second main surface which are opposite to each other and a lateral surface, and the lateral surface includes a first lateral surface portion used as a light incident side and a second lateral surface portion outside the first lateral surface portion; the light guide plate further includes an extending portion extending outwards (Continued)

from at least a part of the second lateral surface portion of the main body portion, and a thickness of the extending portion is smaller than that of the main body portion.

20 Claims, 4 Drawing Sheets

(56) References Cited

FOREIGN PATENT DOCUMENTS

| CN | WO2015096255 | * | 2/2015 | ......... G02F 1/13357 |
|----|--------------|---|--------|------------------------|
| CN | 204328702 U  |   | 5/2015 |                        |
| CN | 204943151 U  |   | 1/2016 |                        |
| CN | 105676339 A  |   | 6/2016 |                        |
| CN | WO2016106851 | * | 7/2016 | ......... G02F 1/13357 |

OTHER PUBLICATIONS

Oct. 30, 2017—(CN) First Office Action Appn 201610096169.0 with English Tran.

* cited by examiner

EDGE-LIT BACKLIGHT UNIT WITH LIGHT GUIDE PLATE HAVING EXTENDING PORTION AND DISPLAY DEVICE

The application is a U.S. National Phase Entry of International Application No. PCT/CN2016/088810 filed on Jul. 6, 2016, designating the United States of America and claiming priority to Chinese Patent Application No. 201610096169.0 filed on Feb. 22, 2016. The present application claims priority to and the benefit of the above-identified applications and the above-identified applications are incorporated by reference herein in their entirety.

TECHNICAL FIELD

Embodiments of the present disclosure relate to an edge-lit backlight unit and a display device.

BACKGROUND

In a backlight unit structure, generally, a rubber frame with a certain width can be relatively arranged at the edge outside a light guide plate. Due to structural space limitation of the rubber frame and the light guide plate, the edge of the light guide plate is close to, for example, a visible region of a display device, so that the backlight unit has edge bright lines at a large viewing angle. Currently, a narrow frame display has become a development tendency. In a narrow frame structure, the edge of the light guide plate is closer to the visible region, so that the problem of the edge bright lines at a large viewing angle is more serious.

SUMMARY

At least one embodiment of the invention provides an edge-lit backlight unit and a display device, which can solve the problem of edge bright lines at a larger view angle.

One aspect of the invention provides an edge-lit backlight unit, comprising a light guide plate and a rubber frame, wherein the light guide plate includes a main body portion, the main body portion is of a flat plate structure and includes a first main surface and a second main surface which are opposite to each other and a lateral surface, and the lateral surface includes a first lateral surface portion used as a light incident side and a second lateral surface portion outside the first lateral surface portion; the light guide plate further includes an extending portion extending outwards from at least a part of the second lateral surface portion of the main body portion, and a thickness of the extending portion is smaller than that of the main body portion; and at least a part of the rubber frame and the second lateral surface portion of the main body portion are oppositely arranged at an interval and the at least a part of the rubber frame is at least partially overlapped with the extending portion in a thickness direction of the main body portion.

For example, the first main surface is a light emergent side, and the extending portion is close to the first main surface.

For example, the rubber frame includes a first surface and a second surface which are opposite to each other and a surface facing the second lateral surface portion, and the first surface and the extending portion are opposite to each other and are arranged at an interval.

For example, one side of the rubber frame, which faces away from the second lateral surface portion, further includes a supporting portion; the supporting portion is connected with the second surface and the first surface and extends towards a direction far away from the second surface; and at least a part of the supporting portion and one side of the extending portion, which is far away from the main body portion, are oppositely arranged at an interval.

For example, the first main surface is the light emergent side, and the extending portion is close to the second main surface.

For example, the thickness of the extending portion is one third to five sixths of the thickness of the main body portion.

For example, the thickness of the extending portion is one second to two thirds of the thickness of the main body portion.

For example, a distance from one side of the extending portion, which is far away from the main body portion, to the main body portion is greater than or equal to 0.5 cm.

For example, the distance from one side of the extending portion, which is far away from the main body portion, to the main body portion is greater than or equal to 1.5 cm.

For example, the extending portion is a wedged structure of which a thickness is gradually decreased from a side close to the main body portion to a side far away from the main body portion.

For example, a wedge angle of the wedged structure is not greater than 30 degrees.

For example, a diffuse reflection coating layer is arranged on at least one of the second lateral surface portion and the surface of the rubber frame, which faces the second lateral surface portion.

For example, a light adsorption thin film is arranged on the surface of the rubber frame, which faces the second lateral surface portion.

For example, the extending portion includes a first portion close to the main body portion and a second portion far away from the main body portion, a thickness of the second portion is greater than that of the first portion, and the second portion is convex towards the first surface of the rubber frame to form a wedged convex portion; a groove matched with the wedged convex portion is formed on the first surface of the rubber frame; and the wedged convex portion is embedded into the groove and is arranged at an interval oppositely to each surface in the groove.

Another aspect of the invention provides a display device, comprising the backlight unit as mentioned above.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure, but not intended to define the disclosure.

FIG. 7b is a side-view schematic diagram of an arrangement mode of the light guide plate and the rubber frame in FIG. 7a;

DETAILED DESCRIPTION

Figure 1:
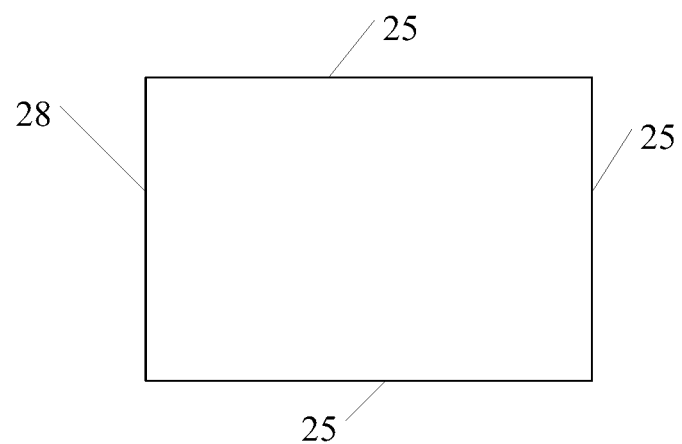
FIG. 1 is a plan schematic diagram of a light guide plate which is of a cuboid structure.

In order to make objects, technical solutions and advantages of the embodiments of the disclosure apparent, the technical solutions of the embodiment of the disclosure will be described in a clearly and fully understandable way in connection with the drawings related to the embodiments of the disclosure. It is obvious that the described embodiments are just a part but not all of the embodiments of the disclosure. Based on the described embodiments of the disclosure herein, those skilled in the art can obtain other embodiment(s), without any inventive work, which should be within the scope of the disclosure.

In a display device using an edge-lit backlight unit, the backlight unit, for example, can include a backplane and a reflective sheet and a light guide plate which are sequentially arranged at one side of the backplane. Optical films are arranged at one side of the light guide plate, which is far away from the backplane, and the optical films include, for example, a diffusion sheet, a lower prism and an upper prism. A shading adhesive tape, for example, can also be arranged at one side of the optical film. A rubber frame with a certain thickness is, for example, arranged around the outer edge of the backplane so as to fix various optical parts from the outside. The rubber frame is generally made of a non-metallic material, e.g., materials of rubber, resin and the like. A light source is arranged at the light incident side of the light guide plate. After light emitted by the light source passes through the light guide plate, part of the light will be leaked out of the lateral surface outside the light incident side of the light guide plate, and the leaked light is reflected after being irradiated to the rubber frame which is arranged at an interval with the light guide plate, so that a light centralization region which is visible in a large viewing angle is formed at the position of the interval between the light guide plate and the rubber frame, i.e., edge bright lines are generated, and a display effect of the display device is influenced.

At least one embodiment of the present disclosure provides an edge-lit backlight unit which includes a light guide plate and a rubber frame, wherein the light guide plate includes a main body portion, the main body portion is of a flat plate structure and includes a first main surface and a second main surface which are opposite to each other and a lateral surface, and the lateral surface includes a first lateral surface portion used as a light incident side and a second lateral surface portion outside the first lateral surface portion; the light guide plate further includes an extending portion extending outwards from the second lateral surface portion of the main body portion; and at least a part of the rubber frame and the second lateral surface portion of the main body portion are oppositely arranged at an interval and the at least a part of the rubber frame is at least partially overlapped with the extending portion in the thickness direction of the main body portion. The extending portion has an effect of moving an edge portion of the light guide plate outwards so as to weaken or eliminate bright lines at a large viewing angle. Such backlight unit of the embodiment of the present disclosure has the advantages of simplicity for manufacturing, easiness for implementation, convenience in assembling and the like.

FIG. 1 is a plan schematic diagram of a light guide plate which is of a cuboid structure. With reference to FIG. 1, for the light guide plate with the cuboid structure, for example, a first lateral surface portion 28 is a light incident side, and the other three lateral surfaces, for example, can be named as second lateral surface portions 25. Extending portions, for example, are formed in a mode that three lateral surfaces extend outwards, i.e., three lateral surfaces except for the light incident side all include the extending portions. For example, the extending portions also can be formed in a mode that two or one of the lateral surfaces extends outwards, or can be formed in a mode that one part of one of the lateral surfaces extends outwards.

The main body portion of the light guide plate of the embodiment of the present disclosure also can be of any other shape, for example, the main body portion only includes two lateral surfaces or includes a plurality of lateral surfaces, for example, at least one lateral surface is set as the light incident side, and other lateral surfaces outside the light incident side form the second lateral surface portions. Moreover, the extending portion, for example, can be of a shape of a flat plate or a wedged plate or any other regular or irregular shape, but the extending portion needs to be guaranteed to be at least partially overlapped with the rubber frame in the thickness direction of the main body portion.

Figure 2:
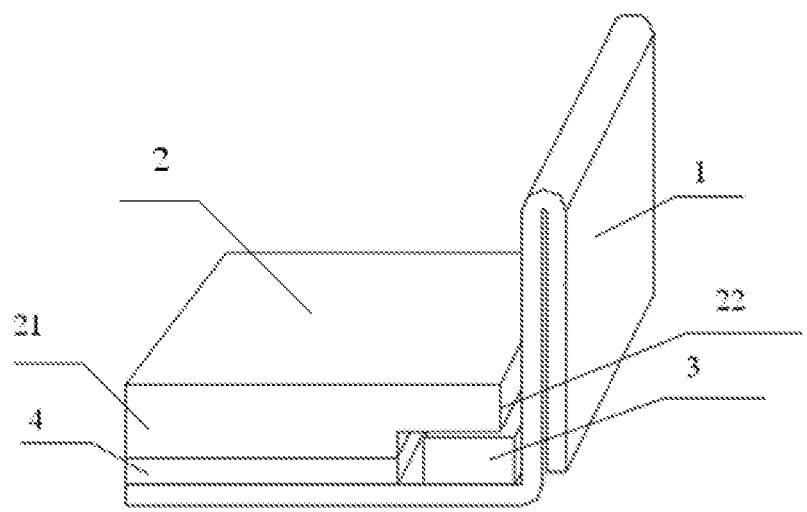
FIG. 2 is a three-dimensional schematic diagram of a backlight unit of an embodiment of the present disclosure.

FIG. 2 is a three-dimensional schematic diagram of a backlight unit according to an embodiment of the present disclosure. With reference to FIG. 2, the backlight unit includes a light guide plate 2 and a rubber frame 3. The light guide plate 2 includes a main body portion 21, and the main body portion 21 is of a cuboid flat plate structure and includes a first main surface and a second main surface which are opposite to each other and four lateral surfaces connected with the first main surface and the second main surface. In four lateral surfaces of the main body portion 21, one lateral surface is used as a first lateral surface portion and is set as a light incident side; and the other three lateral surfaces constitute a second lateral surface portion. With reference to FIG. 2, for example, the light guide plate 2 further includes an extending portion 22 extending outwards from at least one lateral surface (only one lateral surface is shown in FIG. 2) except for the light incident side of the main body portion 21. It can be known from FIG. 2 that a thickness of the extending portion 22 is smaller than that of the main body portion 21. As described above, the extending portion also can extend outwards from three lateral surfaces which constitute the second lateral surface portion, the embodiment of the present disclosure is not specially limited hereto, and the extending portion can be arranged at the position of at least one part of the second lateral surface portion. With further reference to FIG. 2, the extending portion 22 covers the upper side of the rubber frame 3, i.e., the rubber frame 3 is overlapped with the extending portion 22 in the thickness direction of the main body portion 21 of the light guide plate and the rubber frame 3 and the main body portion 21 are at least partially oppositely arranged at an interval. The extending portion weakens the phenomenon of edge bright lines at a large viewing angle by moving the edge of the light guide plate outwards.

The main body portion 21 of the light guide plate shown in FIG. 2 is of a cuboid flat plate structure, and as described above, the main body portion also can be of one of other structures. The extending portion 22 is of a flat plate structure extending outwards along one main surface of the main body portion 21, and as described above, the extending portion also can be of any other structure, e.g., a wedged plate structure. The thickness of the extending portion 22 is smaller than that of the main body portion 21.

The cross section of the rubber frame 3 shown in FIG. 2 is of a rectangular shape, but the structure of the rubber frame is not limited hereto. For example, the cross section of the rubber frame 3 also can be of a square, round, trapezoid or polygon shape or any other irregular shape.

The rubber frame 3, for example, is prepared from a non-metallic material, and for example, is prepared from materials of rubber, resin and the like.

In some embodiments, the backlight unit further can include some other optional parts. For example, FIG. 2 also shows other optional parts in the backlight unit, which include a backplane 1 and a reflective sheet 4, and shows a mutual arrangement relationship among the backplane 1, the reflective sheet 4, the light guide plate 2 and the rubber frame 3. With reference to FIG. 2, both the light guide plate 2 and the rubber frame 3 are arranged at one side of the backplane 1. The reflective sheet 4 is further arranged between the light guide plate 2 and the backplane 1. The rubber frame 3 further includes a portion arranged oppositely to the reflective sheet 4. An arrangement mode of a light source, e.g., Light-Emitting Diode (LED) light bar, can adopt various arrangement modes in the prior art. For example, the LED light bar can be arranged on the rubber frame, and for example, a light emergent surface of the LED faces the light incident side of the light guide plate. Most of light emitted by the light source is reflected by the reflective sheet and is emitted outwards from a light emergent side of the light guide plate, e.g., the first main surface. Simultaneously, part of light can be leaked out of other lateral surfaces of the light guide plate. Such backlight unit structure shown in FIG. 2 can effectively relieve the phenomenon of the edge bright lines at a large viewing angle by moving the edge of the light guide plate outwards.

Figure 3A:
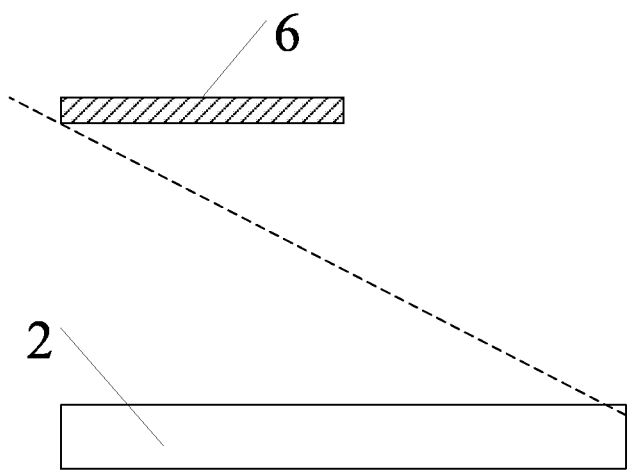
FIG. 3a is a schematic diagram of a generation principle of edge bright lines of a light guide plate at a large viewing angle.
Figure 3B:
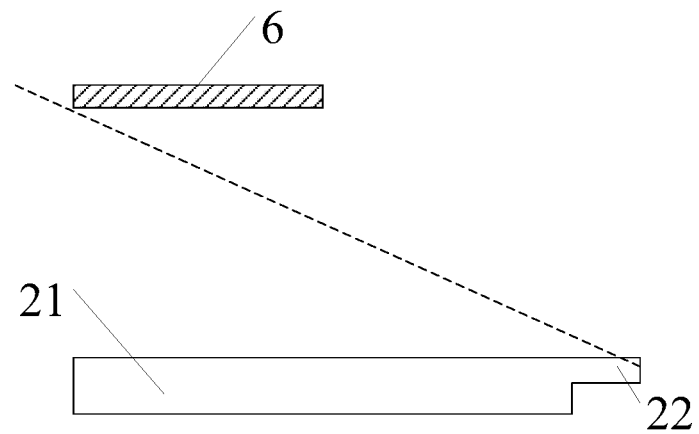
FIG. 3b is a schematic diagram that a light guide plate structure of an embodiment of the present disclosure relieves edge bright lines at a large viewing angle.

FIG. 3a and FIG. 3b are schematic diagrams that the extending portion can relieve the phenomenon of the edge bright lines at a large viewing angle. A black matrix 6 in FIG. 3a and FIG. 3b is arranged in an upper substrate (not shown in drawings) of the display device, and for example, is deposited at a lightproof portion among Red, Green and Blue (RGB) color filters. The black matrix is mainly used for preventing leakage of background light, improving the display contrast and the like. With reference to FIG. 3a, when the light guide plate does not include the extending portion, the light at the edge of the light guide plate can enter human eyes at a certain angle via the edge of the black matrix 6. After the light guide plate is provided with the extending portion, the edge of the light guide plate is moved outwards, and thus, an angle that the light at the outer edge of the extending portion enters the human eyes via the black matrix 6 is obviously decreased, i.e., the phenomenon of the edge bright lines at a large viewing angle is relieved. It should be noted that due to the small viewing angle of the edge bright lines of the light guide plate, after the edge of the light guide plate is moved outwards by the extending portion, the phenomenon of the edge bright lines at a large viewing angle can be effectively weakened and even eliminated. For example, in a sectional view perpendicular to the extending direction of the extending portion, the viewing angle herein can be an angle between a connecting line (dotted lines in FIGS. 3a and 3b) of the inside edge of the black matrix closest to the extending portion in the display device and the outside edge of the extending portion and a straight line in parallel to the light guide plate.

Figure 4:
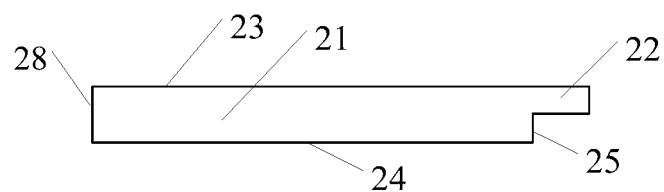
FIG. 4 is a side-view schematic diagram of a light guide plate structure of an embodiment of the present disclosure.

In one embodiment, an extending portion is close to a light incident side. FIG. 4 is a side-view schematic diagram of a light guide plate structure of the embodiment of the present disclosure. With reference to FIG. 4, a main body portion 21 of a light guide plate 2 includes a first main surface 23, a second main surface 24 which are opposite to each other and a lateral surface. The lateral surface includes a first lateral surface portion 28 used as a light incident side and a second lateral surface portion 25 outside the first lateral surface portion. The first main surface 23 is the light emergent side, and the extending portion 22 extends outwards from the second lateral surface portion 25 of the main body portion, is close to the first main surface 23 and for example, is flush with the first main surface 23. By the extending portion, the edge of the light guide plate, which is close to a visible region portion, is moved outwards, so that the phenomenon of edge bright lines at a large viewing angle is relieved and the light guide plate is simple to manufacture.

Figure 5:
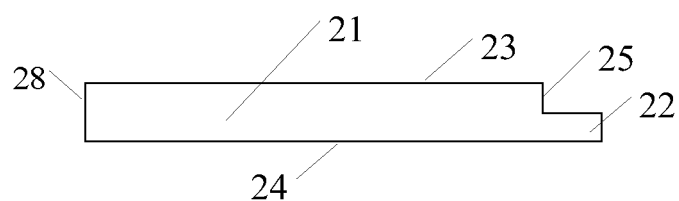
FIG. 5 is a side-view schematic diagram of another light guide plate structure of an embodiment of the present disclosure.

In one embodiment, an extending portion is far away from a light incident side. FIG. 5 is a side-view schematic diagram of a light guide plate of the embodiment of the present disclosure. With reference to FIG. 5, a main body portion 21 of the light guide plate 2 includes a first main surface 23 and a second main surface 24 which are opposite to each other and a lateral surface. The lateral surface includes a first lateral surface portion 28 used as a light incident side and a second lateral surface portion 25 outside the first lateral surface portion 28. The first main surface 23 is the light emergent side, and the extending portion 22 extends outwards from the second lateral surface portion 25 of the main body portion, is close to the second main surface 24 and for example, is flush with the second main surface 24. By the extending portion, the edge of the light guide plate, which is far away from a visible region portion, is moved outwards, so that the phenomenon of edge bright lines at a large viewing angle is relieved and a preparation process of the light guide plate is simplified.

Figure 6A:
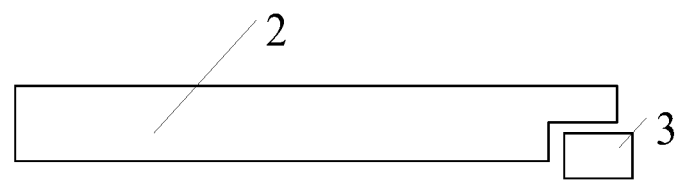
FIGS. 6a to 6c are side-view schematic diagrams of an arrangement mode of a light guide plate and a rubber frame of an embodiment of the present disclosure.
Figure 6B:
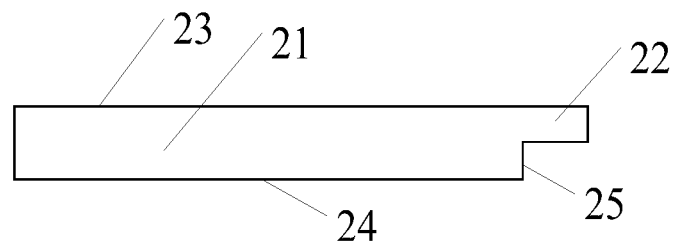
Figure 6C:
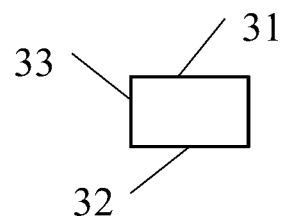

In one embodiment, a rubber frame is completely positioned at one side of an extending portion of a light guide plate, and the extending portion is basically completely overlapped with the rubber frame in the thickness direction. FIGS. 6a to 6c are schematic diagrams of an arrangement mode of the light guide plate and the rubber frame of the embodiment of the present disclosure. FIG. 6a is a side-view schematic diagram of arrangement of the light guide plate and the rubber frame of the embodiment of the present disclosure; FIG. 6b is a side-view schematic diagram of the light guide plate in FIG. 6a; and FIG. 6c is a side-view schematic diagram of the rubber frame in FIG. 6a.

With reference to FIGS. 6a to 6c, a main body portion 21 of the light guide plate 2 includes a first main surface 23 and a second main surface 24 which are opposite to each other and a lateral surface connected with the first main surface 23 and the second main surface 24. The lateral surface includes a first lateral surface portion used as a light incident side and a second lateral surface portion 25 outside the first lateral surface portion. For example, for the case that the main body portion of the light guide plate is of a flat plate cuboid structure, one first lateral surface is the light incident side, the other three lateral surfaces constitute the second lateral surface portion, and only the arrangement case of an extending portion of one lateral surface is shown in the drawings. The first main surface 23 is a light emergent side, and the extending portion 22 extends outwards from the second lateral surface portion 25 of the main body portion 21, is close to the first main surface 23 and for example, is flush with the first main surface 23. The rubber frame 3 includes a first surface 31 and a second surface 32 which are opposite to each other and a surface 33 which is connected with the first surface 31 and the second surface 32 and faces the second lateral surface portion. The extending portion 22 and the first surface 31 are opposite to each other and are arranged at an interval. By the extending portion, the edge of the light guide plate, which is close to one side of the rubber frame, is moved outwards, so that the phenomenon of bright lines at a large viewing angle is effectively weakened.

Figure 7A:
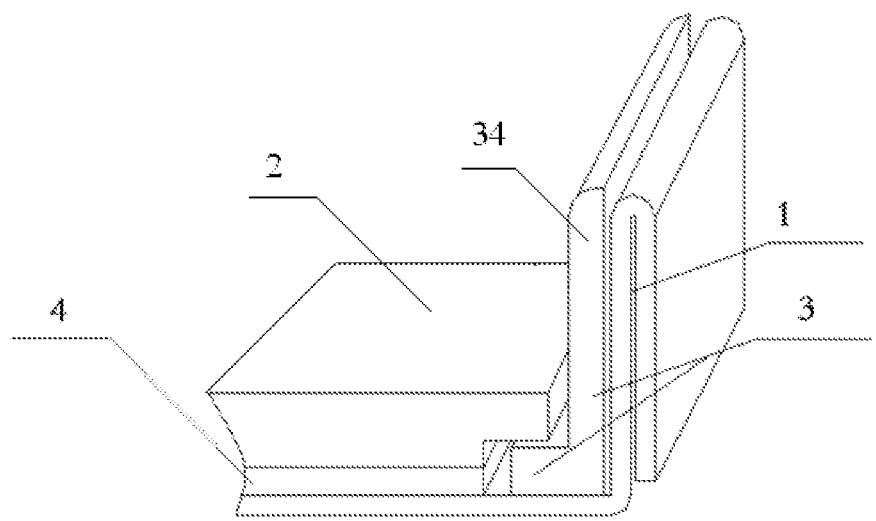
FIG. 7a is a three-dimensional schematic diagram of a backlight unit with another rubber frame structure of an embodiment of the present disclosure.
Figure 7B:
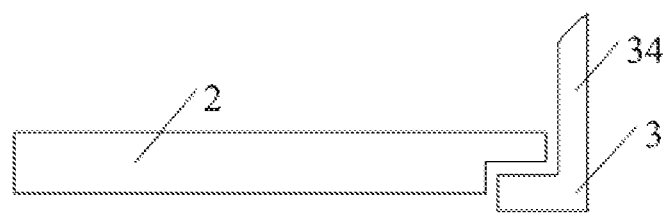

In one embodiment, a rubber frame further includes a supporting portion. FIG. 7a is a three-dimensional schematic diagram of a backlight unit of which the rubber frame includes the supporting portion according to the embodiment of the present disclosure; and FIG. 7b is a side-view schematic diagram of an arrangement mode of the light guide plate and the rubber frame in FIG. 7a. With reference to FIGS. 7a and 7b, the side of the rubber frame 3, which faces away from a second lateral surface 33, includes the flat-shaped supporting portion 34; and the supporting portion 34 is connected with a second surface 32 and a first surface 31 and extends towards the direction far away from the second surface 32. At least part of the supporting portion 34 and one side of the extending portion 22, which is far away from the main body portion 21, are oppositely arranged at an interval, i.e., one part of the flat-shaped supporting portion 34 and the outer edge of the extending portion 22 are oppositely arranged at an interval.

In the embodiment, an opposite arrangement mode of the first surface 31, the second surface 32 and the surfaces 33 connected with the first surface 31 and the second surface 32 of the rubber frame 3 and the light guide plate 2 is, for example, the same as those in the embodiments above, can refer to the previous description and is not repeated herein. By the extending portion, the edge of the light guide plate is moved outwards so as to effectively weaken the phenomenon of edge bright lines at a large viewing angle, and the supporting portion of the rubber frame further improves stability of the backlight unit structure.

It should be noted that FIG. 7a further shows a backplane and a reflective sheet. With further reference to FIG. 7a, one side of the supporting portion 34, which is far away from the light guide plate, and the backplane are oppositely arranged at an interval. For example, one side of the supporting portion 34, which is far away from the light guide plate, also can be attached to the backplane 1 so as to improve stability of the backlight unit structure and protect optical elements in the backlight unit better. The reflective sheet 4 is also arranged between a second main surface 24 of the main body portion of the light guide plate and the backplane. The reflective sheet 4 and a third lateral surface of the rubber frame, for example, also at least partially face each other and arranged at an interval so as to improve stability of the backlight unit structure.

In one embodiment, a thickness ratio of an extending portion and a main body portion can be further regulated. In one aspect, the extending portion has an effect of moving the edge of a light guide plate outwards. Therefore, edge bright lines are difficult to observe at the outwards moved edge of the light guide plate at a large viewing angle; but the edge of the light guide plate, which is not moved outwards, still has bright lines at a large viewing angle. Thus from this perspective, a greater thickness ratio of the extending portion and the main body portion is better. In another aspect, with reference to the previous description, the rubber frame and the edge of the light guide plate have portions arranged to face each other, so that the rubber frame can fix the light guide plate from the outside of the light guide plate. In other words, from the perspective of ensuring a fixing effect of the rubber frame on optical parts, e.g., the light guide plate and the like, a smaller thickness of the extending portion is better so as to enable the entire backlight unit to be more stable in structure. Therefore, a greater thickness ratio of the extending portion and the main body portion is also not better really, or the light guide plate cannot be effectively fixed. Influence of variations of the thickness of the extending portion on the edge bright lines and structural stability of the backlight unit is comprehensively considered, for example, the thickness of the extending portion is one third to five sixths of the total thickness of the light guide plate, and for example, the thickness of the extending portion is one second to second thirds of the total thickness of the light guide plate, so that the phenomenon of the edge bright lines in a large viewing angle can be effectively relieved on the premise of ensuring structural stability of the backlight unit.

In one embodiment, a distance from one side of an extending portion, which is far away from a main body portion, to the main body portion can be defined. In one aspect, the longer the distance between one side of the extending portion, which is far away from the main body portion, and the main body portion is, the farther the edge of a light guide plate is moved outwards, and the less obvious the phenomenon of edge bright lines at a large viewing angle is. In another aspect, due to structural limitation of a backlight unit, an outwards moving quantity of the light guide plate is limited to a certain extent. Moreover, in the case of allowance of a structural space of the backlight unit, the edge of the light guide plate only needs to extend to a position where the bright lines at a large viewing angle can be eliminated. For example, the distance H from one side of the extending portion, which is far away from the main body portion, to the main body portion is not smaller than 0.5 cm and for example, is not smaller than 1.5 cm. Meanwhile, those skilled in the art can set the maximum value of H according to the space limitation of the backlight unit, which is not specially limited herein. By setting the distance from one side of the extending portion, which is far away from the main body portion, to the main body portion, the phenomenon of the edge bright lines at a large viewing angle can be effectively relieved and even eliminated.

Figure 8:
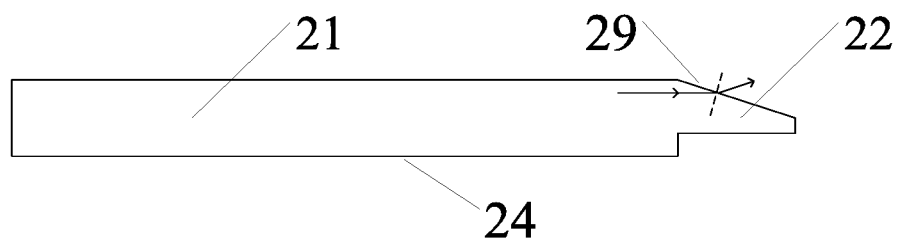
FIG. 8 is a side-view schematic diagram of a light guide plate with a wedged extending portion of an embodiment of the present disclosure.

In one embodiment, the shape of an extending portion can be set as a wedge shape. With reference to FIG. 8, the extending portion 22 is of a wedged structure of which the thickness is gradually decreased from the side close to a main body portion 21 to the side far away from the main body portion 21. FIG. 8 shows a moving direction of a light path after parallel light is irradiated to the wedged structure of the light guide plate. Namely, such wedged structure can enable the parallel light entering from one side of the light guide plate to be inclined upwards after passing through the wedged structure and reduce the light irradiated to a rubber frame so as to effectively reduce light leakage at the edge of the light guide plate and relieve the phenomenon of edge bright lines at a large viewing angle.

In the embodiment, for example, a wedge angle of the wedged extending portion can be further defined, and for example, the wedge angle is not greater than 30 degrees so as to further reduce a light leakage quantity at the position of a wedge surface. The wedge angle means an angle between a plane where a wedged surface 29 is positioned and a plane where a second main surface 24 is positioned.

In one embodiment, second lateral surface portions outside a light incident side of a main body portion of a light guide plate, for example, the other three lateral surfaces of the main body portion with a cuboid structure, all include extending portions so as to relieve the phenomenon of edge bright lines at a large viewing angle better.

In one embodiment, edge bright lines in a large viewing angle can be weakened or eliminated by enabling light laterally leaked out of a light guide plate to be diffusely reflected. For example, surfaces of the light guide plate and a rubber frame, which are mutually oppositely arranged, can be coated with diffuse reflection coatings, so that parallel light leaked out of the light guide plate is diffusely reflected and brightness of the edge bright lines at a large viewing angle is reduced. For example, a diffuse reflection paint including polyvinyl alcohol and barium sulfate is sprayed to the surfaces of the light guide plate and the rubber frame, which are mutually oppositely arranged, to prepare the diffuse reflection coatings. For example, a nano diffuse reflection paint also can be sprayed to the surfaces of the light guide plate and the rubber frame, which are mutually oppositely arranged, to prepare the diffuse reflection coatings. For example, the surface of the light guide plate, which is arranged oppositely to the rubber frame, is coated with the diffuse reflection coating, or the surface of the rubber frame, which is arranged oppositely to the light guide plate, is coated with the diffuse reflection coating, or the surfaces of the light guide plate and the rubber frame, which are mutually oppositely arranged, are respectively coated with the diffuse reflection coatings, so that the light is diffusely reflected via the diffuse reflection coatings before or after being leaked out of the lateral surface of the light guide plate, thereby further reducing brightness of the edge bright lines and improving a display effect.

In one embodiment, a layer of light adsorption film can be arranged on the surface of a rubber frame, which is opposite to a light guide plate. The layer of light adsorption film can adsorb light leaked out of the lateral surface of the light guide plate so as to eliminate the basic reason of generating edge bright lines. The light adsorption film, for example, needs to have a certain heat resistance so as to ensure that when the temperature of a backlight unit is risen, the light adsorption film cannot be decomposed or changed. For example, the light adsorption film is a black light adsorption film prepared from a high polymer material, and for example, the light adsorption film can be adhered to the surface of the rubber frame, which is opposite to the light guide plate, so as to sufficiently adsorb light leaked out of the edge of the light guide plate and relieve the phenomenon of the edge bright lines at a large viewing angle.

Figure 9:
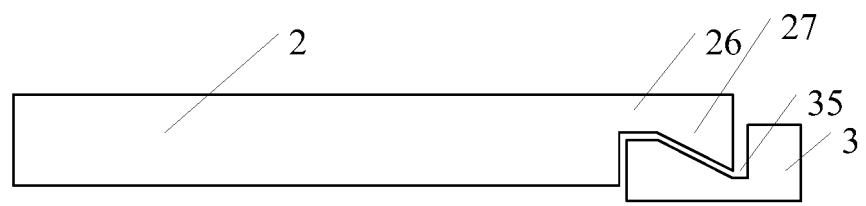
FIG. 9 is a side-view schematic diagram of an extending portion and rubber frame mutually-clamped structure of an embodiment of the present disclosure.

In one embodiment, the outside of an extending portion of a light guide plate and a rubber frame can be designed into mutually clamped structures. FIG. 9 shows an extending portion and rubber frame mutually-clamped structure. With reference to FIG. 9, the extending portion of the light guide plate includes a first portion 26 close to a main body portion and a second portion 27 far away from the main body portion. One side of the first portion 26 is connected with the main body portion, and the other side of the first portion 26 is connected with one side of the second portion 27. A thickness of the second portion 27 is greater than that of the first portion 26, and the second portion 27 is convex towards a first surface of the rubber frame to form a wedged convex portion. A first groove 35 matched with the wedged convex portion is formed on the first surface of the rubber frame 3. For example, the first groove 35 can be formed by machining in a direction from the first surface 31 to the second surface 32 in the embodiments above, and also can be directly formed by a die. In a backlight unit, the wedged convex portion of the second portion 27 is embedded into the first groove 35 and is arranged at an interval oppositely to each surface of the first groove 35. The extending portion and the rubber frame also can be of other mutually clamped structures, and the present disclosure is not limited to the structure above. By adopting such the extending portion and rubber frame mutually-clamped structure, when the edge bright lines are relieved, structural stability of the backlight unit can be improved.

An embodiment of the present disclosure further provides a display device including the backlight unit as mentioned above. The display device has a better display effect.

In the present disclosure, words such as "first", "second" and the like do not request or denote any relationship or order between entities or operations, but rather are used for distinguishing one entity or operation from another entity or operation. Words such as "include" and "comprise" are open-ended expressions, not exclusive of the case that the included processes, methods and objects further have other elements. It further should be noted that words such as "up", "down" and the like denote direction or position relationships based on the accompanying drawings, and are only used for facilitating describing the present disclosure and simplifying description, rather than indicate or denote that the indicated apparatus or elements shall have specific directions and be constructed and operated in specific directions, and thus, it should not be understood as limitation to the present disclosure. Unless otherwise defined, words such as "installing", "connected" and "connecting" should be understood in general, for example, can be fixed connection, also can be detachable connection, or integrated connection, can be mechanical connection, also can be electrical connection, can be direct connection, also can be indirect connection by an intermediate medium, and also can be communication inside two elements. Those ordinarily skilled in the art can understand the specific meaning of the words in the present disclosure according to the particular case.

The specific embodiments above can be mutually combined, do not exceed the scope of the present disclosure, and can bring a better combination effect.

The foregoing embodiments merely are exemplary embodiments of the disclosure, and not intended to define the scope of the disclosure, and the scope of the disclosure is determined by the appended claims.

The present application claims priority of the Chinese Patent Application No. 201610096169.0 filed on Feb. 22, 2016, the disclosure of which are incorporated herein by its reference in its entirety as part of the present application.

The invention claimed is:

1. An edge-lit backlight unit, comprising a light guide plate and a rubber frame, wherein
the light guide plate includes a main body portion, the main body portion is of a flat plate structure and includes a first main surface and a second main surface which are opposite to each other and a lateral surface, and the lateral surface includes a first lateral surface portion used as a light incident side and a second lateral surface portion outside the first lateral surface portion;
the light guide plate further includes an extending portion extending outwards from at least a part of the second lateral surface portion of the main body portion, and a thickness of the extending portion is smaller than that of the main body portion; and at least a part of the rubber frame and the second lateral surface portion of the main body portion are oppositely arranged at an interval and the at least a part of the rubber frame is at least partially overlapped with the extending portion in a thickness direction of the main body portion, the edge-lit backlight unit further comprises a reflective sheet arranged on a side of the second main surface facing away from the first main surface, and the rubber frame has a portion arranged oppositely to the reflective sheet in a direction parallel to the first main surface, the extending portion extends beyond the reflective sheet in a direction of the extending outwards from the at least part of the second lateral surface portion of the main body portion.

2. The backlight unit according to claim 1, wherein the first main surface is a light emergent side, and the extending portion is close to the first main surface.

3. The backlight unit according to claim 2, wherein the rubber frame includes a first surface and a second surface which are opposite to each other and a surface facing the second lateral surface portion, and the first surface and the extending portion are opposite to each other and are arranged at an interval.

4. The backlight unit according to claim 2, wherein the thickness of the extending portion is one third to five sixths of the thickness of the main body portion.

5. The backlight unit according to claim 2, wherein a distance from one side of the extending portion, which is far away from the main body portion, to the main body portion is greater than or equal to 0.5 cm.

6. The backlight unit according to claim 1, wherein the rubber frame includes a first surface and a second surface which are opposite to each other and a surface facing the second lateral surface portion, and the first surface and the extending portion are opposite to each other and are arranged at an interval.

7. The backlight unit according to claim 6, wherein one side of the rubber frame, which faces away from the second lateral surface portion, further includes a supporting portion; the supporting portion is connected with the second surface and the first surface and extends towards a direction far away from the second surface; and at least a part of the supporting portion and one side of the extending portion, which is far away from the main body portion, are oppositely arranged at an interval.

8. The backlight unit according to claim 6, wherein a diffuse reflection coating layer is arranged on at least one of the second lateral surface portion and the surface of the rubber frame, which faces the second lateral surface portion.

9. The backlight unit according to claim 6, wherein a light adsorption thin film is arranged on the surface of the rubber frame, which faces the second lateral surface portion.

10. The backlight unit according to claim 6, wherein the extending portion includes a first portion close to the main body portion and a second portion far away from the main body portion, a thickness of the second portion is greater than that of the first portion, and the second portion is convex towards the first surface of the rubber frame to form a wedged convex portion; a groove matched with the wedged convex portion is formed on the first surface of the rubber frame; and the wedged convex portion is embedded into the groove and is arranged at an interval oppositely to each surface in the groove.

11. The backlight unit according to claim 1, wherein the first main surface is a light emergent side, and the extending portion is close to the second main surface.

12. The backlight unit according to claim 11, wherein the thickness of the extending portion is one third to five sixths of the thickness of the main body portion.

13. The backlight unit according to claim 11, wherein a distance from one side of the extending portion, which is far away from the main body portion, to the main body portion is greater than or equal to 0.5 cm.

14. The backlight unit according to claim 1, wherein the thickness of the extending portion is one third to five sixths of the thickness of the main body portion.

15. The backlight unit according to claim 14, wherein the thickness of the extending portion is one half to two thirds of the thickness of the main body portion.

16. The backlight unit according to claim 1, wherein a distance from one side of the extending portion, which is far away from the main body portion, to the main body portion is greater than or equal to 0.5 cm.

17. The backlight unit according to claim 16, wherein the distance from one side of the extending portion, which is far away from the main body portion, to the main body portion is greater than or equal to 1.5 cm.

18. The backlight unit according to claim 1, wherein the extending portion is a wedged structure of which a thickness is gradually decreased from a side close to the main body portion to a side far away from the main body portion.

19. The backlight unit according to claim 18, wherein a wedge angle of the wedged structure is not greater than 30 degrees.

20. A display device, comprising the backlight unit according to claim 1.

* * * * *